Sept. 21, 1948.  J. L. BARNES  2,449,833
VALVE
Filed Sept. 11, 1945

Inventor.
Julius L. Barnes
By his Atty
John H. McKenna

Patented Sept. 21, 1948

2,449,833

UNITED STATES PATENT OFFICE 2,449,833

VALVE

Julius L. Barnes, Allston, Mass.

Application September 11, 1945, Serial No. 615,523

6 Claims. (Cl. 251—92)

This invention relates to improvements in valves and more particularly to valves having provision for micromatic control of fluid flow on a course which is generally straight through the valve, whereby the volume of flow may be varied by minute increments between completely closed and completely open limits. The invention attains a superior degree of sensitivity and accuracy of fluid control in a valve structure which can be considerably smaller and more compact than the prior comparable structures having corresponding maximum flow capacity.

It is among the objects of the invention to provide a valve structure wherein the maximum flow capacity of the valve is determined by the area of angularly related narrow slots in coacting flow control elements, and wherein the maximum flow capacity of any particular valve may be determined primarily by selection of the proper length of the slots without sacrificing a rugged strength of the slotted walls necessary to withstand relatively heavy pressures to which they may be subjected. I employ relatively fixed cylindrical walls set across the flow passage with the opposite walls of the cylinder each provided with a slot having extent generally in the direction of the axis of the cylinder, and a plug rotatable in the cylinder and having a slot through the plug whose extent is generally along the axis of the plug. The slots in the cylinder walls and the plug are angularly related so that they coact upon rotation of the plug to pass micromatic increments of fluid generally on a straight course through the valve, and the slot in the plug is formed at the opposite surfaces of the plug so that, in one direction of the plug, the full area of cylinder slots registers with the plug slot, for maximum flow straight through the valve.

Another object is to provide in a valve coacting flow control slots of which one is in a rotatable valve element having reversed V-shaped entrances to its slot at opposite sides of the element, whereby the V-entrances coact with relatively fixed slots to provide a flow passage micromatically variable by rotation of the said element and having maximum flow capacity when a side wall of a V-entrance registers with a side wall of a relatively fixed slot.

Yet another object is to provide a valve having slotted relatively rotatable elements in which the slots all extend generally in the direction of extent of the axis of the rotatable element.

A further object is to provide a slotted rotatable flow control element having cylindrical exterior surfaces coacting with slotted surrounding cylindrical walls, in which pressure of fluid acting on the rotatable element presses the rotatable element tightly against the remote cylindrical wall with lapping effect, thereby ensuring a sealing tightness between the said element and walls at the discharge side of the valve.

Still another object is to provide a valve structure, including a slotted rotatable element, which readily may be adapted for either clockwise or counter-clockwise rotation of said element for opening of the valve. By turning the said element through 180 degrees, prior to assembly, and re-locating a stop member, the valve can be converted from a clockwise opening valve to a counter-clockwise opening valve.

Another and important object is to provide a valve structure having flow slots which coact in opening and closing of the valve so that each like increment of opening and closing movement increases or decreases the flow capacity the same amount as each other increment between fully closed and fully open or fully open and fully closed positions. A movement of the movable valve member a fractional part of its permissible full movement produces an equal fractional increase or decrease in the flow capacity of the valve.

It is, moreover, my purpose and object generally to improve upon prior valve and fluid control structures.

Figure 1:
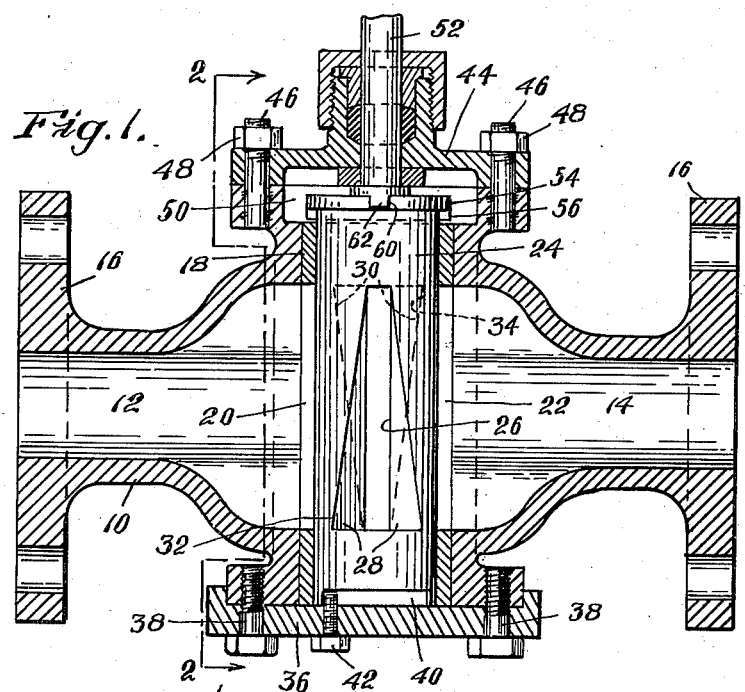
Figure 1 is a cross-sectional view of a valve embodying features of the invention, the section being approximately on line 1—1 of Figure 2 but with the rotatable element turned to the maximum flow position.
Figure 5:
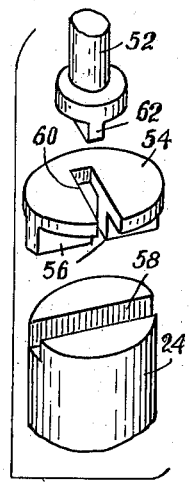
Figure 5 is a perspective of the loose connecting plate and the upper end of the rotatable element with which it engages.

Referring to the drawing, the valve casing 10 preferably will be a casting of any suitable material. It has the oppositely disposed passages 12, 14 for straight-away flow through the valve, with the outer extremity of each passage surrounded by a flange 16 for convenient connection of the valve in a pipe line or the like.

Figure 3:
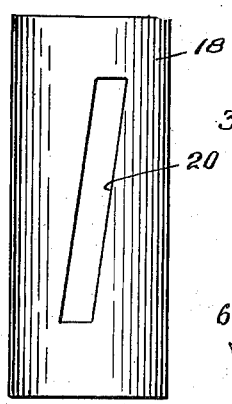
Figure 3 is an elevation of the slotted sleeve.

A cylindrical sleeve 18 extends across the interior of the valve casing 10, it being fixed in position between the inner ends of the flow passages 12, 14 and tightly fitting the interior of the casing so that fluid cannot escape around the sleeve from one passage to the other. The sleeve wall opposite the inner end of passage 12 is provided with a slot 20, and the sleeve wall opposite the inner end of passage 14 is provided with a slot 22, each slot having its major extent along the sleeve but at a predetermined slight angle with respect to the axis of the sleeve, as clearly shown in Fig. 3 where the two slots are represented in precise registration.

Figure 2:
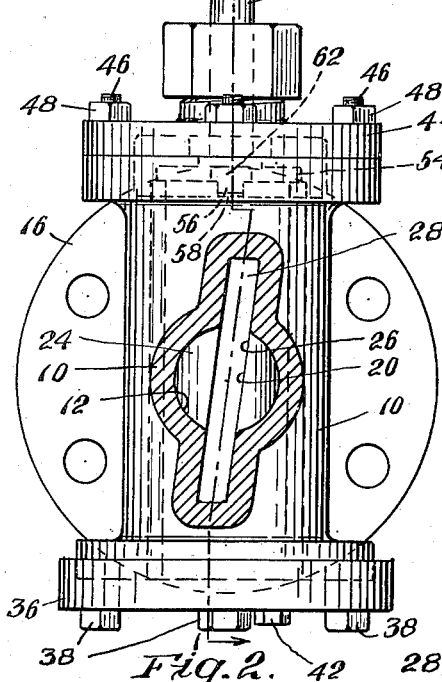
Figure 2 is a cross-sectional view on line 2—2 of Figure 1.
Figure 6:
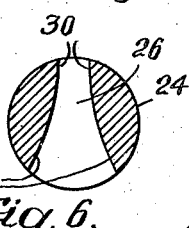
Figure 6 is a cross-sectional view on line 6—6 of Figure 4, showing the heavy and rugged bodies of metal extending on opposite sides of the slot.
Figure 4:
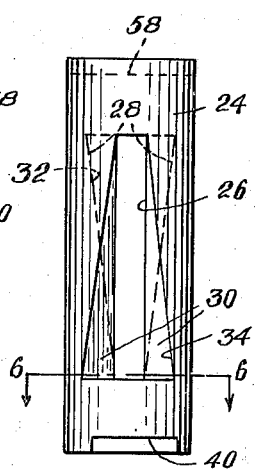
Figure 4 is an elevation of the slotted rotatable element.

A rotatable plug element 24 nicely fits within sleeve 18 and has a slot 26 extending through it, with the larger dimension of the slot disposed along the plug. The plug has cylindrical exterior surfaces for coaction with the walls of sleeve 18, thereby facilitating operative movements of the plug as compared with prior tapered valve elements. It is an important feature of the invention that the plug slot 26 has reversed V-shaped entrances to the slot at opposite sides of the plug. As best seen in Figs. 4 and 6, the slot 26 flares gradually outward from one end to the other at one side of the plug as indicated at 28, and flares gradually outward in the opposite direction at the other side of the plug as indicated at 30. By this means, I attain a V-shaped entrance or mouth 28 at one side of the plug and a reversed V-shaped entrance or mouth 30 at the other side with a Venturi-like throat extending inward from each mouth to the opposite side of the plug. Preferably the angles of the V-arms are the same as the angles of the slots 20, 22 in sleeve 18. Also all of the slots are of the same length. Hence, with the plug in its position of Fig. 1, flow through the valve is completely cut off by the solid portions of the plug covering the slots 20, 22 of the sleeve. However, a clockwise rotation of the plug in Fig. 1 first brings the angular portion 32 of V-mouth 28 opposite the sleeve slot 20 and the angular portion 34 of V-mouth 30, at the far side in Fig. 1, opposite the sleeve slot 22, with gradually increasing micromatic increments of fluid flow through the valve until the position of maximum flow is reached as represented in Fig. 2, where the full areas of the sleeve slots 20, 22 are uncovered.

A feature of importance resulting from my described construction of the plug element 24 is that rugged and strong bodies of metal extend as rigid legs or struts along opposite sides of the plug slot 26, providing against possibility of collapse under the heavy pressures to which such valves may be subjected. Prior slotted valve elements have had to be relatively weak in order to attain a suitable capacity of a slot or slots extending generally in directions around the axis of the slotted elements. My plug may have its slot as long as may be desired without weakening the plug. Also my plug is of a nature to be conveniently cast with its slot generally of the shape as shown.

As herein represented, the valve casing 10 is formed with top and bottom openings which facilitate mounting of the sleeve 18 in fixed relation to the casing. The bottom opening is closed by a cover plate 36 which may be secured in place in any suitable manner, as by the screws 38. The inner end of the plug element 24 has a bearing on the cover plate 36 and, conveniently, a portion of the inner end of the plug may be cut away as at 40 in Fig. 1, to provide shoulders which can coact with an abutment 42 carried by the cover plate for limiting the rotational movement of the plug in each direction.

The valve as represented is assembled for opening movement of the plug element 24 in clockwise direction. However, assembly of the parts with the plug turned 180 degrees from its position of Fig. 1, and with suitable re-location of the stop 42, will convert the valve for counterclockwise opening. This provision for converting the valve is important where limitations of space may require that the opening movement be in a particular direction.

The top opening in casing 10 is shown closed by a cover plate 44 which may be secured in place by any suitable means as the threaded rods 46 fixed in the casing and projecting through holes in plate 44, with nuts 48 clamping the plate against the casing. However, the casing and plate 44 preferably are formed to provide the chamber 50 into which the outer end of plug 24 projects, and it is a feature that the valve stem 52 has a loose connection to the plug so that the plug is not restrained by the valve stem against slight movements. Hence, under pressure of fluid acting at one side of the plug, the plug may be forced into tight lapping engagement with the sleeve at the opposite side thereby to ensure a tight seal against escape of fluid. To this end a plate connector 54 is provided at the outer end of the plug. The plate has a depending rib 56 which slidably engages in a groove 58 in the top of the plug. The plate 54 also has a slot 60 therein disposed at right angles to the rib 56, and a lug or rib 62 on the inner end of the valve stem loosely engages in the slot. Hence the connector plate 54 effectively connects the plug and valve stem for rotation in unison but the connection is such that the plug is free to move for the mentioned lapping of the sleeve under fluid pressure.

The top cover plate 44 has a usual opening for passage therethrough of the valve stem, suitable packing being represented around the stem ensuring against leakage. However, with my valve construction as disclosed, there is little or no tendency for leakage either around the sleeve and plug or along them and I have found that there is no necessity for packing the valve stem.

Obviously my improved valve may be used advantageously wherever a carefully regulated flow of fluid is desired. One specific use is for controlling the flow of fuel oil to an oil burner, in which case it may be desirable to limit the closing movement of the plug element 24 to less than a complete closing, so that a minor increment of fuel flow may be permitted at all times for supplying a pilot, for example.

It is desirable that fluid-flow-control valves, for most purposes, shall gradually increase and decrease in flow-capacity with gradual movement of the valve-control element. Also, where the valves are to be controlled by an actuating lever the opening and closing movements, from limit to limit, of the rotary valve member preferably should not exceed 110° of movement and, in any event, an arcuate movement which includes a dead center position should be avoided. In other words, the opening and closing movements should not be short and sudden but neither should they include too long an arc of movement. With my construction both opening and closing of the valve is gradual and each increment of rotary motion of the plug element produces the same increase or reduction in flow-capacity as each other increment. A rotation of the plug a quarter of the distance between its limits increases or decreases the flow-capacity by a quarter. Similarly, a rotation of the plug one-half of its possible movement increases or decreases the flow-capacity to one-half the maximum flow-capacity. Furthermore, my improved valve provides oppositely disposed seals controlling oppositely disposed flow orifices thereby minimizing the possibility of leakage. Also my opening and closing movements are well within the desirable limits for connecting rod or actuating lever operation of the valve.

From the foregoing description, it will be obvious that I have provided a superior type of micromatic fluid-control valve in which the flow of fluid is generally straight through the valve. Also, my provision of a valve element which is slotted along the axis of the element permits increase of maximum flow-capacity by merely lengthening the plug and sleeve and their slots. By this means relatively small and compact valves are provided which can have needed strength for withstanding relatively high fluid pressures. Slotted valve constructions as heretofore available have been required to be large and cumbersome in order to have needed strength. My improved valve attains greater sensitivity and accuracy of control in considerably smaller units as compared with the prior structures of corresponding maximum flow-capacity.

I claim as my invention:

1. Fluid flow-control mechanism comprising a casing having a flow passage therein, a fixed wall disposed across the flow passage and having a relatively long and narrow slot therein for flow of fluid through the wall, an element movable relative to said wall and having a relatively long and narrow slot extending therethrough with solid portions adjacent the entrance to the slot in said movable element for covering said slot in the fixed wall, said slot in the movable element having its entrance flared in generally V-shape, and said slot in the fixed wall having its longer side walls parallel and disposed at the same angle as a side of the said V-shaped flared entrance to the slot in said movable element, whereby movement of said V-entrance of the movable element in general direction across the slot in the fixed wall gradually uncovers one end of the relatively narrow slot in the fixed wall and progressively uncovers more and more of that slot toward the other end thereof until the full area of the slot in the fixed wall is in register with said V-entrance, for maximum flow through said slots.

2. In a valve casing having interior walls spaced apart and provided with relatively long and narrow slots for flow of fluid through the walls, a fluid-control element disposed between said walls and rotatably engaging therewith, said element having a relatively long and narrow slot therethrough disposed with its longer dimension extending generally along the axis of rotation of said element and having a flared generally V-shaped entrance to the slot at one side of the element, and a flared inverted generally V-shaped entrance to the slot at the other side of the element, and the slots in said walls each having its longer side walls parallel and disposed at approximately the same angle as a side of a said entrance to the slot of the rotatable element, whereby rotation of said element in one direction from a position in which it covers said wall slots gradually uncovers more and more of the wall slots from one end to the other thereof until their full areas are in register with said V-shaped and inverted V-shaped entrances to the slot in the rotatable element, for maximum flow approximately straight through said slots.

3. In a valve casing having interior cylindrical walls with a relatively long and narrow slot in each of opposite walls for flow of fluid, a flow-control element rotatable within said cylindrical walls and having a relatively long and narrow slot therethrough whose larger dimension is disposed generally along the axis of the element, said slot in said element having a flared generally V-shaped entrance at one side of the element, and a flared generally inverted V-shaped entrance at the other side of the element for co-action with said wall slots to uncover more and more of said wall slots from one end to the other thereof upon rotation of said element.

4. In a fluid flow-control mechanism, a cylindrical sleeve having a relatively long and narrow rectangular slot opening through each of opposite wall portions of the sleeve, the length dimension of said slots being disposed along the sleeve at an angle to the axis of the sleeve, and the two slots being in registering alignment, a rotatable element nicely fitting the interior of the sleeve and having a slot therethrough generally of the shape and size of the slots in said sleeve and having its length dimension disposed along the axis of the element, said slot in said element having a flared generally V-shaped mouth at one side of the element and a flared generally inverted V-shaped mouth at the other side of the element, and the angular disposition of said sleeve slots corresponding approximately with the angle of a side of a said V-shaped and inverted V-shaped mouth at opposite sides of the rotatable element.

5. Mechanism for micromatic control of flow of a fluid, comprising a casing having a generally straight flow passage therethrough, a cylindrical sleeve fixed in position across said passage and arranged to completely obstruct flow through the casing, a relatively long and narrow slot in each opposite wall of the sleeve and disposed with their length dimensions along but at an angle to the axis of the sleeve, a plug fitting nicely and rotatably in the sleeve and having a slot therethrough approximating in shape and size the slots in the sleeve, and having its length dimension disposed along the axis of the plug, said plug slot having a flared generally V-shaped mouth at one side of the plug and a flared generally inverted V-shaped mouth at the other side of the plug, for rotary coaction with the sleeve slots to gradually increase flow through the mechanism by micromatic increments from a zero capacity to a maximum flow capacity in which the full areas of the sleeve slots are in register with the mouths of the plug slot at opposite sides of the plug.

6. In a fluid flow-control mechanism including a casing having interior cylindrical walls with a slot in each of opposite walls for flow of fluid, a flow-control element rotatable within said cylindrical walls and having a relatively long and narrow slot therethrough whose length dimension is disposed generally along the axis of the element, said slot in said element having a flared generally V-shaped mouth at one side of the element and a flared generally inverted V-shaped mouth at the other side of the element, a stem for rotating said element, and a loose slotted plate connection between the stem and said element whereby said element is free to yield into lapping engagement with said cylindrical walls under pressure of the fluid.

JULIUS L. BARNES.

REFERENCES CITED

The following references are of record in the file of this patent:

UNITED STATES PATENTS

| Number | Name | Date |
| --- | --- | --- |
| 727,743 | Brunner | May 12, 1903 |

FOREIGN PATENTS

| Number | Country | Date |
| --- | --- | --- |
| 692,459 | France | Aug. 4, 1930 |